United States Patent [19]

Minekane

[11] Patent Number: 4,812,657
[45] Date of Patent: Mar. 14, 1989

[54] MULTIUNIT TUBE AND A SPECTROPHOTOMETER

[75] Inventor: Tomiharu Minekane, Ootawara, Japan

[73] Assignee: Kabushiki Kaisha Toshiba, Kawasaki, Japan

[21] Appl. No.: 172,957

[22] Filed: Mar. 23, 1988

Related U.S. Application Data

[63] Continuation of Ser. No. 921,273, Oct. 21, 1986, abandoned.

[30] Foreign Application Priority Data

Oct. 31, 1985 [JP]   Japan .................................. 60-242653

[51] Int. Cl.⁴ .............................................. G01J 1/20
[52] U.S. Cl. .................................. 250/372; 356/51; 356/328
[58] Field of Search .................. 250/372; 356/51, 300, 356/326, 328

[56] References Cited

U.S. PATENT DOCUMENTS 4,070,112  1/1978  Tsunazawa et al. .................. 356/51
4,158,505  2/1979  Mathisen et al. .................... 356/308
4,342,516  8/1982  Chamran et al. .................... 356/328
4,692,883  9/1987  Nelson et al. ...................... 364/571
4,755,056  7/1988  Yasuda et al. ...................... 356/51

OTHER PUBLICATIONS

American Laboratory, Willis, B. G. et al., Jun. 81, pp. 62–71, "Parallel Access Spechrophotometer".

Primary Examiner—Bruce C. Anderson
Assistant Examiner—John A. Miller
Attorney, Agent, or Firm—Oblon, Fisher, Spivak, McClelland & Maier

[57] ABSTRACT

The inside of a casing of a multiunit tube is divided into two chambers by a partition wall. The partition wall is formed with an opening through which light is transmitted. A deuterium lamp for emitting ultraviolet light, and a tungsten lamp for emitting visible light, are disposed in the first and second chambers, respectively. The casing is formed, on its first-chamber side, with a window, through which the ultraviolet and visible lights from the lamps are let out. The opening is fitted with a filter for reducing the liminous intensity of the visible light from the tungsten lamp.

8 Claims, 5 Drawing Sheets

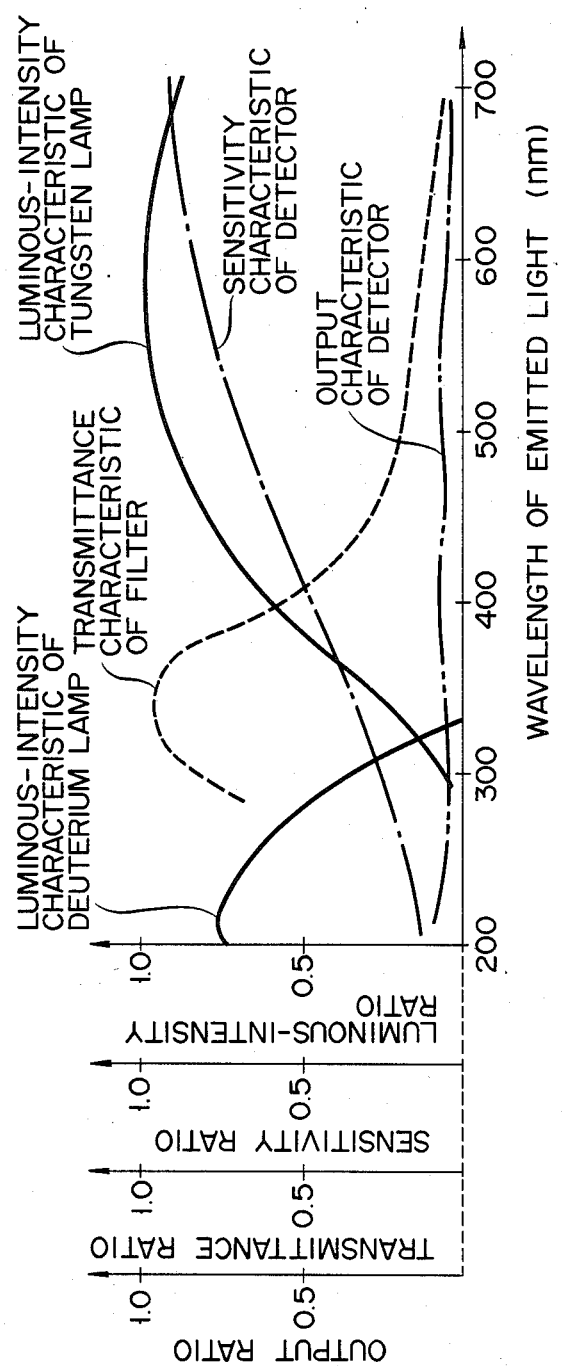
F I G. 6

MULTIUNIT TUBE AND A SPECTROPHOTOMETER

This application is a continuation of application Ser. No. 921,273, filed on Oct. 21, 1986, now abandoned.

BACKGROUND OF THE INVENTION

The present invention relates to a multiunit tube for radiating ultraviolet light and visible light, and more specifically, to a spectrophotometer using the multiunit tube.

Spectrophotometers of the so-called pre-spectral type are conventionally known in the art. In one such spectrophotometer, as disclosed in Japanese Patent Publication No. 55-4253, light emitted from a light source is separated into its spectral components by a spectroscope, whereupon a light beam of a desired wavelength length is applied to a sample. Then, the light beam transmitted through the sample is detected by a detector. Thus, the absorbance or other properties of the sample are measured.

According to these prior art pre-spectral spectrophotometers, the light from the light source is diffracted spectrally, and the light beam of the desired wavelength is applied selectively to the sample. Thus, the measurement requires means for such selection, and therefore, it cannot be accomplished with speed. Moreover, the space around the sample must be kept dark, lest stray light interfere with the diffracted light. In consequence, the operating efficiency of the spectrophotometers is low.

In order to cope with these problems of the pre-spectral system, there have been developed multi-wavelengths spectrophotometers of the so-called post-spectral type.

According to the post-spectral spectrophotometers, the light from the light source is applied directly to the sample, and the light beam transmitted through the sample is separated into its spectral components by a spectroscope, which is formed of a holographic concave diffraction grating. The spectral components or beams, having wavelength within the range of the ultraviolet or visible spectrum, are focused on a photodetector or which a plurality of beam spots are separately formed along a straight line. The spectrally diffracted beams are detected by the photodetector, which is formed of a silicon-photodiode array, disposed on the converging point of the diffracted beams, and covering channels 64 to 1,024 of the array.

A silicon photodiode has a high sensitivity to visible light, and a low sensitivity to ultraviolet light. In the multi-wavelength spectrophotometers of the post-spectral type, therefore, stray light beams, such as scattered beams, account for a substantial percentage of all the light beams (covering all the wavelength ranges) introduced into the spectroscope. It is therefore difficult to make an effective measurement.

An improved multi-wavelength spectrophotometer of the post-spectral type has been developed. This version includes an ultraviolet light source and a visible light source, such that ultraviolet and visible light beams, emitted from the light sources, are applied alternatively to a sample, using a selector mirror for selection.

The spectrophotometer of this type, however, requires the selector mirror, shiftable for the selection between the ultraviolet and visible light beams, and a drive mechanism for the mirror. The shift of the mirror takes much time and lacks reliability.

In consideration of these circumstances, use of a multiunit tube, incorporating the ultraviolet and visible light sources as a unit, has been proposed and tried.

In FIG. 1, showing an example of the multiunit tube, numeral 2 designates a casing, the inside of which is divided into two chambers 6 and 8 by partition wall 4. Wall 4 is formed with opening 10. Deuterium lamp 12 and tungsten lamp 14 are arranged beside opening 10, in first and second chambers 6 and 8, respectively. Casing 2 is formed with window 16 on the side of first chamber 6, corresponding in position to opening 10. An ultraviolet light beam, emitted from lamp 12, and a visible light beam, emitted from lamp 14, are radiated through window 16.

In FIG. 2, full lines represent the visible- and ultraviolet-spectrum radiation characteristics of the multiunit tube constructed in this manner. As seen from FIG. 2, the luminous intensity of lamp 12 is very high in the range of the ultraviolet spectrum, and lowers drastically as the wavelength becomes longer. On the other hand, the luminous intensity of lamp 14 is very high in the range of the visible spectrum, and lowers as the wavelength becomes shorter.

As mentioned before, the sensitivity of the silicon photodiode, which is used as the detector, is high within the range of the visible spectrum, and very low for the ultraviolet spectrum, as indicated by as dashed line in FIG. 2.

As indicated by a two-dot chain line in FIG. 2, therefore, the output of the detector is high in the range of the visible spectrum, and very low in the range of the ultraviolet spectrum. Thus, ultraviolet measurements are suspectible to the influence of visible light, so that spectrophotometric operation cannot be accomplished with stability.

SUMMARY OF THE INVENTION

The object of the present invention is to provide a multiunit tube and a spectrophotometer using the same, in which ultraviolet measurements on samples cannot be influenced readily by visible light, thus permitting stable spectrophotometric operation.

According to one aspect of the present invention, there is provided a multiunit tube, which comprises a casing; a partition wall dividing the inside of the casing into first and second chambers, the wall having a light transmitting portion through which light is transmitted; ultraviolet light-generating means located in the first chamber, and emitting an ultraviolet light beam; visible light-generating means located in the second chamber, and emitting a visible light beam; a window formed in the casing, on the side of the first chamber, through which the ultraviolet and visible light beams, from the ultraviolet and visible light-generating means, respectively, are emitted; and filter means for reducing the luminous intensity of the visible light beam emitted from the window.

According to another aspect of the present invention, there is provided a spectrophotometer, which comprises a multiunit tube for applying a light beam to a vessel containing a sample therein, the tube including a casing, a partition wall dividing the inside of the casing into first and second chambers, the wall having a light transmitting portion through which light is transmitted, ultraviolet light-generating means located in the first chamber, and emitting an ultraviolet light beam, visible light-generating means located in the second chamber, and emitting a visible light beam, a window formed in the casing, on the side of the first-chamber, through which the ultraviolet and visible light beams, from the ultraviolet and visible light-generating means, respectively, are emitted, and filter means for reducing the luminous intensity of the visible light beam emitted from the window; spectroscopic means for separating the light beam, applied from the multiunit tube and transmitted through the sample in the vessel, into spectral components; and detecting means for detecting the spectral components delivered from the spectroscopic means.

With use of the multiunit tube and the spectrophotometer accoring to the present invention, the luminous intensity of visible light can be reduced, so that ultraviolet measurements on samples cannot be influenced readily by visible light. Thus, the spectrophotometric operation is stabilized.

BRIEF DESCRIPTION OF THE DRAWINGS

FIGS. 3 to 6 show one embodiment of the present invention, in which FIG. 3 is a schematic view of a spectrophotometer, FIG. 4 is a sectional view of a multiunit tube, FIG. 5 is a diagram showing the relationship between the wavelength and transmittance of a filter, FIG. 6 is a diagram showing the relationships between the wavelength and the luminous-intensity ratio, sensitivity ratio, transmittance ratio, and output ratio.

DETAILED DESCRIPTION OF THE PREFERRED EMBODIMENTS

Figure 1:
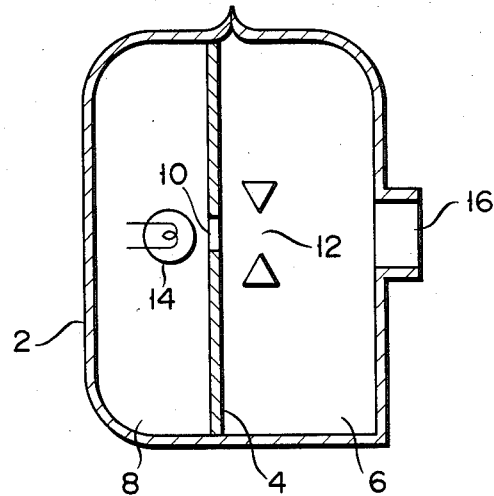
FIG. 1 is a sectional view of a prior art multiunit tube.
Figure 3:
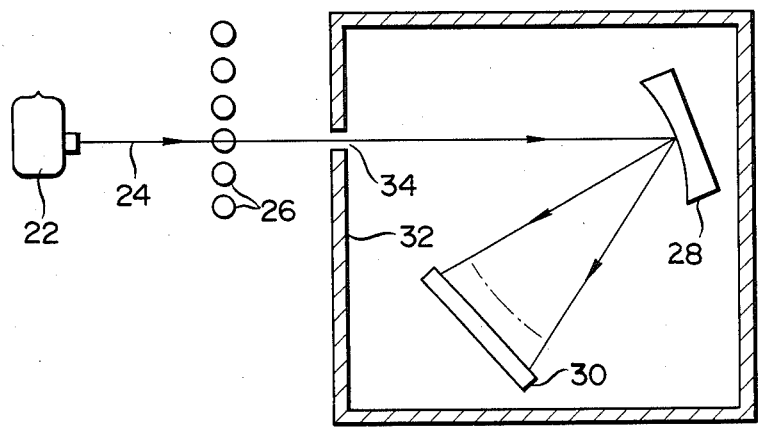
Figure 2:
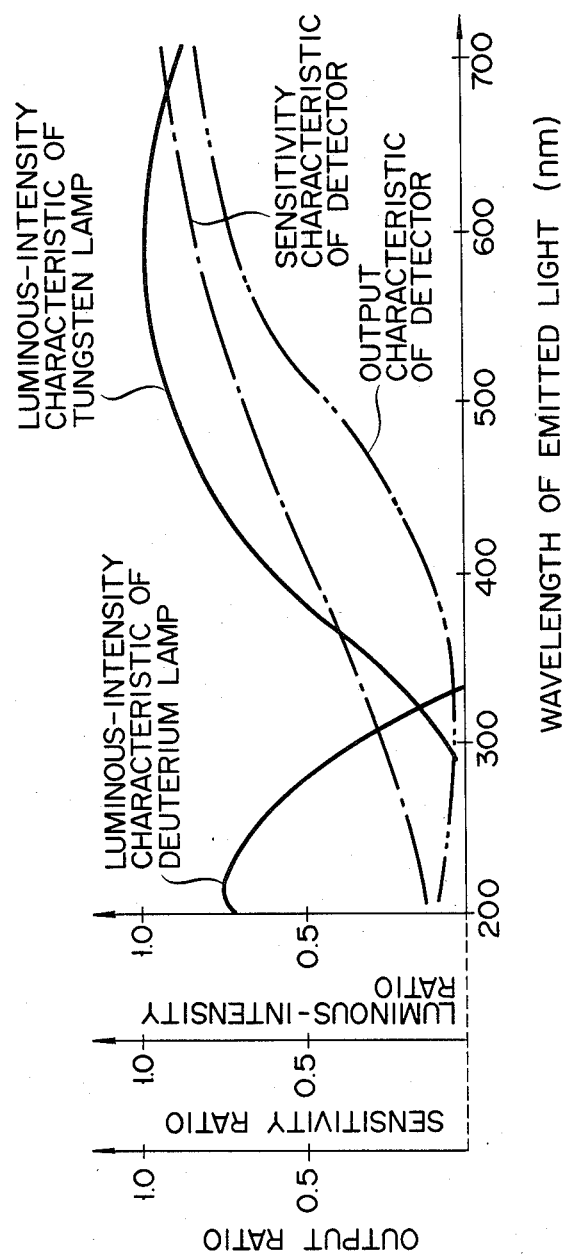
FIG. 2 is a diagram showing the relationships between the wavelength and the luminous-intensity ratio, sensitivity ratio, and output ratio, in a spectrophotometer using the multiunit tube of FIG. 1.

In FIG. 3, numeral 22 designates a multiunit tube. A light beam emitted from multiunit tube 22 advances along optical axis 24, and is first applied to one of a plurality of vessels 26, which contain samples, individually. Vessels 26 are transported intermittently in a line, by a transport system (not shown). The light beam, transmitted through the sample in vessel 26, is incident on spectroscope 28, formed of a holographic concave diffraction grating, whereby it is separated into its spectral components. These component, having wavelengths within the range of the ultraviolet or visible spectrum, focused on a photodetector 30 on which a plurality of beam spots are separately formed along a straight line. Photodetector 30, formed of a silicon-photodiode array, covering channels 64 to 1,024 of the array, is disposed on the converging point of the spectrally-diffracted beams. The detector serves to detect the diffracted beams. A silicon photodiode has a characteristic such that its photosensitivity is high within the range of the visible spectrum, and is very low for the ultraviolet spectrum, as indicated by a dashed line in FIG. 6. Numeral 32 denotes a housing, which is used to keep the space around spectroscope 28 and detector 30 dark. Housing 32 has slit 34 through which light is introduced.

Figure 4:
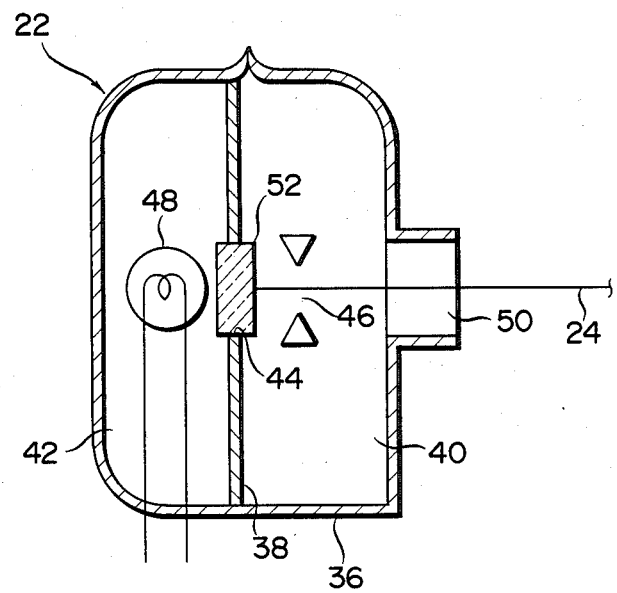

As shown in FIG. 4, multiunit tube 22 includes casing 36. The inside of casing 36 is divided into two chambers 40 and 42 by partition wall 38. Wall 38 is formed with opening 44 through which light is transmitted. Deuterium lamp 46 and tungsten lamp 48 are arranged beside opening 44, in first and second chambers 40 and 42, respectively. Lamp 46 has a characteristic such that its luminous intensity is very high in the range of the ultraviolet spectrum, and lowers drastically as the wavelength becomes longer. Lamp 48 has a characteristic such that its luminous intensity is very high in the range of the visible spectrum, and lowers as the wavelength become shorter.

Casing 36 is formed with radiation window 50 on the side of first chamber 40, corresponding in position to openign 44. Opening 44, deuterium lamp 46, and window 50 are arranged in the order named, on the optical axis of tungsten lamp 48. Thus, an ultraviolet light beam, emitted from lamp 46, and a visible light beam, emitted from lamp 48, are radiated through window 50.

Figure 5:
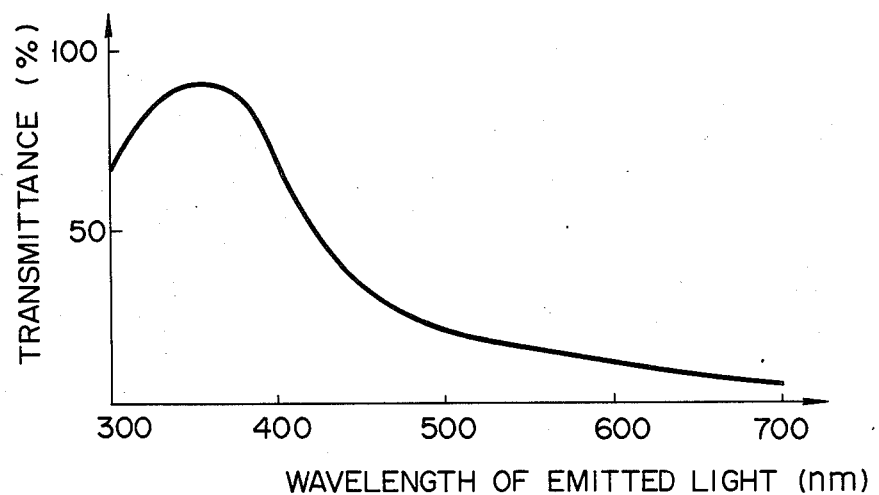

Opening 44 of partition wall 38 is fitted with filter 52, which has a high ultraviolet-spectrum transmittance and a low visible-spectrum transmittance, as shown in FIG. 5 or indicated by a broken line in FIG. 6. Preferably, LB-200 (Hoya Co., Ltd., Japan) or the like should be used for filter 52.

The ultraviolet light beam, emitted from deuterium lamp 46, is projected on detector 30, without being trnsmitted through filter 52. In this case, the beam is not influenced by filter 52. Since the photosensitivity of detector 30 to ultraviolet light is low, however, the output of the detector is low, as indicated by a two-dot chain line in FIG. 6.

On the other hand, the visible light beam, emitted from tungsten lamp 48, is transmitted through filter 52 to be incident on detector 30. In this case, the luminous intensity of the transmitted light is reduced, due to the low visible-spectrum transmittance of filter 30. Since the sensitivity of detector 30 to visible light is high, however, the output of the detector takes the same value as in the case of the ultraviolet detection.

Accordingly, the output of detector 30 can be made substantially constant throughout the ranges of ultraviolet and visible spectra. Therefore, measurements of samples by means of ultraviolet light cannot readily be affected by visible light, thus permitting stable spectrophotometric operation.

In the embodiment described above, partition wall 38 is provided with filter 52, which has a high ultraviolet-spectrum transmittance and a low visible-spectrum transmittance. Since the ultraviolet light beam from deuterium lamp 46 is not transmitted through filter 52, however, the partition wall may alternatively be fitted with a filter, whose transmittance is low in both the ranges of ultraviolet and visible spectra.

Figure 7:
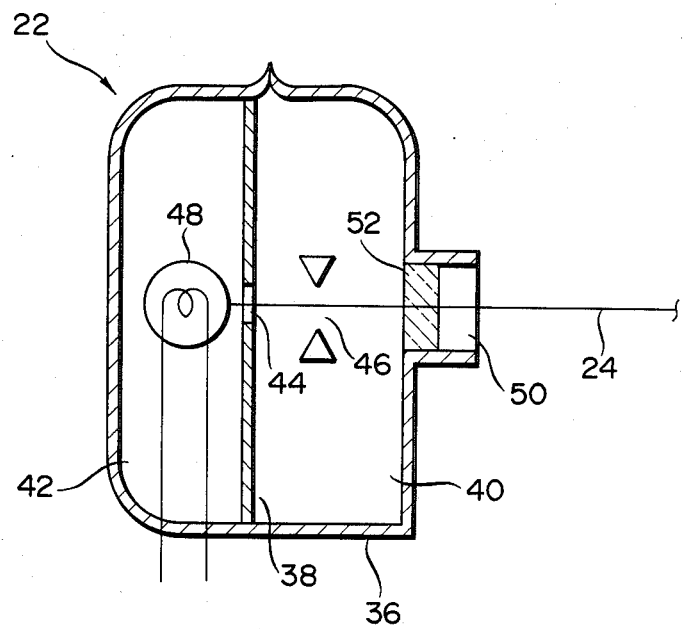
FIG. 7 is a sectional view showing a modified embodiment of the multiunit tube.

When using filter 52 with a high ultraviolet-spectrum transmittance, it may be fitted on casing 36, as shown in FIG. 7, for example. In short, the filter must only be located on optical axis 24 of tungsten lamp 48.

What is claimed is:

1. A spectrophotometer comprising:
   a multiunit tube said tube comprising:
   a casing, a partition wall dividing the inside of the casing into first and second chambers, said wall having an opening through which light is transmitted,
   ultraviolet light-generating means located in the first chamber, and emitting an ultraviolet light beam.
   visible light-generating means located in the second chamber, and emitting a visible light beam such that the optical axis of said visible light-generating means, the optical axis of said ultraviolet light-generating means and said opening are aligned;

a window formed in the casing, on the side of the first chamber, through which the ultraviolet and visible light beams, from the ultraviolet and visible light-generating means are emitted, filter means disposed in said aligned opening of said partition wall, for reducing the luminous intensity of the visible light beam emitted from the window, said filter means having a high ultraviolet-spectrum transmittance and a low visible-spectrum transmittance, so low as to eliminate the influence of visible light on the measurement with said ultraviolet light;

means for positioning a sample directly in the light beam passing through said window;

spectroscopic means for separating the light beam, applied from the multiunit tube and transmitted through said sample, into spectral components; and detecting means having a high detection sensitive to visible light and a low detection sensitivity to ultraviolet light, for detecting the spectral components delivered from the spectroscopic means such that spectral response of said detecting means is substantially constant throughout the range of visible to ultraviolet light.

2. The spectrophotometer according to claim 1, wherein said filter means is located on the optical axis of the visible light-generating means.

3. The spectrophotometer according to claim 2, wherein said filter means includes a filter attached to the partition wall.

4. The spectrophotometer according to claim 3, wherein said filter is attached to the casing.

5. The spectrophotometer according to claim 1, wherein said filter means, said ultraviolet light-generating means, and said window are arranged in the order named, on the optical axis of the visible light-generating means.

6. The spectrophotometer according to claim 1, wherein said ultraviolet light-generating means includes a deuterium lamp, and said visible light-generating means includes a tungsten lamp.

7. The spectrophotometer according to claim 1, wherein said photodetector includes a photodiode array.

8. The spectrophotometer according to claim 1, wherein said spectroscopic means includes a concave diffraction grating.

* * * * *